(12) United States Patent
Calcote

(10) Patent No.: US 6,209,597 B1
(45) Date of Patent: Apr. 3, 2001

(54) POWER TOOL MOUNTING STAND

(76) Inventor: Hal Calcote, 2137 Kidd Rd., Nolensville, TN (US) 37135

( * ) Notice: Subject to any disclaimer, the term of this patent is extended or adjusted under 35 U.S.C. 154(b) by 0 days.

(21) Appl. No.: 09/396,672

(22) Filed: Sep. 8, 1999

(51) Int. Cl.[7] .......................... B27C 5/00; B25H 5/00
(52) U.S. Cl. .......................... 144/326; 83/468; 83/574; 83/471.3; 83/477.2; 83/48.7; 144/1.1; 144/285; 144/286.1; 144/287; 451/361
(58) Field of Search ............................ 144/1.1, 48.7, 144/286.1, 286.5, 287, 253.1, 253.2, 285, 329; 83/471.3, 468, 477.2, 574; 269/901; 312/244; 451/361

(56) References Cited

U.S. PATENT DOCUMENTS

| | | |
|---|---|---|
| 2,767,747 | 10/1956 | Burrows . |
| 2,786,500 | 3/1957 | Unterfranz .................... 144/285 |
| 2,803,275 | 8/1957 | Ruben ............................ 144/285 |
| 3,036,608 | 5/1962 | Weber ............................ 144/285 |
| 3,342,226 | 9/1967 | Marcoux et al. ............ 144/286.1 |
| 3,556,623 | 1/1971 | Damijonaitis ................ 312/244 |
| 3,734,151 | 5/1973 | Skripsky ........................ 141/1.1 |
| 4,114,665 | 9/1978 | Decker ........................ 144/286.1 |
| 4,186,784 * | 2/1980 | Stone ............................ 144/1.1 |
| 4,252,239 | 2/1981 | Snyder ........................... 206/349 |
| 4,445,412 | 5/1984 | Peters ........................... 83/477.2 |
| 4,465,114 * | 8/1984 | Schumacher ................. 144/1.1 |
| 4,494,591 | 1/1985 | Fplkerth ..................... 144/286.5 |
| 4,502,518 | 3/1985 | Lewin ......................... 144/286.5 |
| 4,719,951 | 1/1988 | Woltanski .................. 144/253.1 |
| 4,733,704 * | 3/1988 | Wolff ............................. 144/1.1 |
| 4,875,513 | 10/1989 | Skarsten ..................... 144/286.1 |
| 5,067,535 | 11/1991 | Wolff ........................... 144/286.1 |
| 5,165,317 | 11/1992 | Findlay ......................... 83/574 |
| 5,191,935 * | 3/1993 | McCombie ..................... 144/1.1 |
| 5,383,977 | 1/1995 | Pearce ......................... 144/286.5 |
| 5,518,053 * | 5/1996 | Robison ......................... 144/1.1 |
| 5,647,420 | 7/1997 | Michell ....................... 144/286.1 |
| 5,722,473 | 3/1998 | Tucker ........................ 144/286.1 |

* cited by examiner

*Primary Examiner*—W. Donald Bray
(74) *Attorney, Agent, or Firm*—Waddey & Patterson; David B. Pieper (57) ABSTRACT

A positionable top for operatively positioning a power tool by adjusting the position of the top in relation to a frame. By utilizing multiple engaging slots on the frame and a matching projection on the square top, the top may be rotated, inverted, horizontally adjusted, and vertically positioned within a frame to support various portable power tools in a variety of positions. The power tools are locked to the top by clamps which utilize "T" shaped grooves as both clamp rails and miter guide grooves.

19 Claims, 11 Drawing Sheets

POWER TOOL MOUNTING STAND

BACKGROUND OF THE INVENTION

The present invention relates generally to power tool mounting tables and workbenches. More particularly, this invention pertains to multiple tool mounting platforms for mounting various power tools.

Several United States Patents have been directed towards systems for mounting powered tools. These include U.S. Pat. No. 2,767,747, issued to Burrows on Oct. 23, 1956; U.S. Pat. No. 2,786,500, issued to Unterfranz on Mar. 26, 1957; U.S. Pat. No. 2,803,275, issued to Ruben on Aug. 20, 1957; U.S. Pat. No. 3,036,608, issued to Weber on May 29, 1962; U.S. Pat. No. 3,556,623, issued to Damijonaitis on Jan. 19, 1971; U.S. Pat. No. 4,114,665, issued to Decker on Sep. 19, 1978; U.S. Pat. No. 4,252,239, issued to Snyder on Feb. 24, 1981; U.S. Pat. No. 5,647,420, issued to Michell on Jul. 15, 1997; and U.S. Pat. No. 5,722,473, issued to Tucker on Mar. 3, 1998. A general overview of these patents shows the limitations associated with the prior art systems.

U.S. Pat. No. 2,767,747 issued to Burrows on Oct. 23, 1956 discloses a conversion unit for portable saw. This invention is directed to converting a portable circular saw into a fixed position bench-type or relatively fixed power driven circular saw. This invention utilizes a table with a work supporting platform to hold a circular saw in an upside down position to allow for the portable circular saw to be used like a table or fixed position circular saw.

U.S. Pat. No. 2,786,500 issued to Unterfranz on Mar. 25, 1957 discloses a combination carrying case and table for portable power tool. This invention is directed towards the combination of the carrying case and mounting stand for a portable power driven tool to allow for the tool to be utilized as a stationary positioned tool. This case may then be converted to supply a carrying case for protection of the tool during transportation.

U.S. Pat. No. 2,803,275 issued to Ruben on Aug. 20, 1957 discloses a portable power table saw. This invention describes the use of a portable motor driven tool assembly which is included in a storage box body adapted to receive a saw blade which extends outside of the box.

U.S. Pat. No. 3,036,608 issued to Weber on May 29, 1962 discloses a portable supporting and mounting device for power tools. This invention discloses a portable device which may be disassembled for carrying and transportation. The device may also be assembled to provide a stable platform to mount an angular positioned power saw unit.

U.S. Pat. No. 3,556,623 issued to Damijonaitif on Jan. 19, 1971 discloses a combination carrying case and tool holder for portable power tools. This invention discloses a combination carrying case and tool holder for portable power tools such as a router. The device uses a slidable cover and base assembly for mounting a power tool in a fixed manner. Thus, a portable saber saw sander, or similar power tool, such as a router, may also be used and installed.

U.S. Pat. No. 4,114,665 issued to Decker on Sep. 19, 1978, discloses a woodworking bench for portable motor driven hand tools. This invention discloses a portable woodworking bench which utilizes collapsible legs to provide a stable surface with a vertical wall or fence for mounting power tools. The device is directed towards the mounting of a power driven hand operated belt sander. However, additional motor driven hand tools including saws and routers are also described as being attached to the woodworking bench.

U.S. Pat. No. 4,252,239 issued to Snyder on Feb. 24, 1981 discloses a carpenter's combination portable power-operated hand and table saw. This invention again describes a portable hand carrying case for carrying a circular saw and mounting the circular saw within the case for providing a table saw type operation.

U.S. Pat. No. 5,647,420 issued to Michell on Jul. 15, 1997 discloses a cantilevered linear hand-held power tool attachment apparatus. This device is directed towards an attachment device for releaseably mounting a hand held power tool. This device describes a method for attaching a power tool above and yet in a planar relationship to the top of a work table. The device allows for connections of hand held circular saws, routers and jig saws. This allows for the hand held power tool to be operated on the work piece that is contained between the upper plane holding the power hand saw and the lower table surface.

U.S. Pat. No. 5,722,473 issued to Tucker on Mar. 3, 1998 discloses a wood bench-based interchangeable power tool mounting and operating apparatus. This invention describes a work bench frame which includes a base. The base supports at least one main support pallet which mounts an electrical power tool. Thus, this bench provides a way to mount particular power tools for use in a stable operating environment.

These patents fail to recognize the need for multiple mounting heights, the different sizes and mounting systems necessary for mounting various power tools, and a fence rail system. What is needed, then, is a compact, portable, multiple tools system which allows for utilization of portable tools in a stable work environment.

SUMMARY OF THE INVENTION

In accordance with the present invention, an improved power tool mounting apparatus and method are provided which addresses the drawbacks of the prior art devices and in one of its exemplary form includes a positionable top for operatively positioning a power tool by adjusting the position of the top in relation to a frame. By utilizing multiple engaging slots on the frame and a matching projection on the square top, the top may be rotated, inverted, horizontally adjusted, and vertically positioned within a frame to support various portable power tools in a variety of positions. The power tools are locked to the top by clamps which utilize "T" shaped grooves as both clamp rails and miter guide grooves.

In accordance with one exemplary embodiment of the present invention, a power tool mounting apparatus is provided comprising a frame with a top for fixably positioning a power tool within the frame. The top may be adjusted and positioned within the frame to position the power tool for operation. The power tool is locked into position by a clamp system that utilizes a clamp base that may be positioned within a clamp rail to fit the size and configuration of the power tool being used. A clamp arm is pivotally connected to the clamp base and is used to engage the power tool. Pressure is applied to the clamp arm through a pressure bolt that is inserted through the clamp arm and connected to a pressure base. The clamp base and pressure base slide within a t-groove until the pressure from the pressure bolt frictionally engages the pressure base and clamp base against the t-groove.

In accordance with another example of the present invention, a method is disclosed for adjusting a top in a power tool mounting stand which includes rotating the top to re-orient the portable power tool.

A further example of the present invention is shown in a method for adjusting a top in a power tool mounting stand which includes sliding the top to re-orient the portable power tool.

A still further example of the present invention is disclosed in the method for adjusting the top in a power tool mounting stand which allows one to invert the top to vertically position the portable power tool.

Yet another example is shown in the method for adjusting a top in a power tool mounting stand by selectively inserting the top into a selected vertical adjustment position to vertically position the portable power tool.

Other objects and further scope of the applicability of the present invention will become apparent from the detailed description to follow, taken in conjunction with the accompanying drawings wherein like parts are designated by like reference numerals.

DESCRIPTION OF THE PREFERRED EMBODIMENTS

Figure 1:
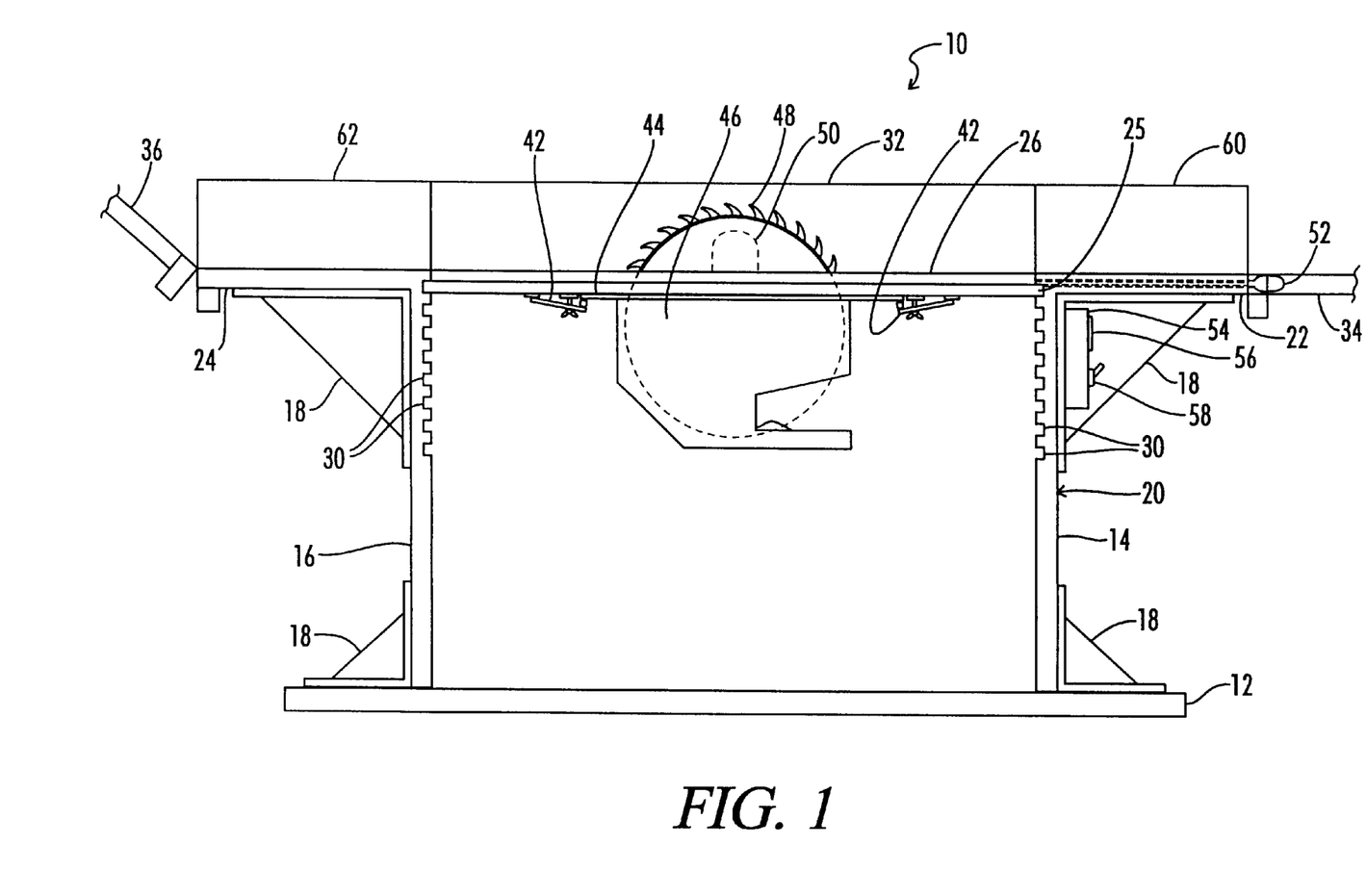
FIG. 1 is a front view of the power tool mounting apparatus of the present invention.

As shown in FIG. 1 of the drawings, a power tool mounting apparatus 10 is constructed from an accessory table top 26 which is supported on a frame 20. The top 26 is adjustable within the frame 20 and may be fixably positioned within the frame 20 to support a power tool. The frame 20 is constructed on a base 12 with a side support system which extends from the base 12 and includes a first side 14 and a second side 16. The first side 14 and the second side 16 are supported by braces 18 which stabilize the sides 14 and 16 on the base 12. The first side 14 is connected to a first extension 22 by a brace 18. Likewise, a second extension 24 is supported off of the second side 16 by another brace 18. The first extension 22 and second extension 24 each form a work surface which extends the available work area of the apparatus. The extensions 22 and 24, sides 14 and 16, base 12 and braces 18 form a frame 20 which supports the accessory tabletop 26. The accessory tabletop 26 is supported by a projection 25 on the top 26. This projection 25 inserts into a projection slot 30 which is formed into the first side 14 and second side 16 of the frame 20.

Figure 2:
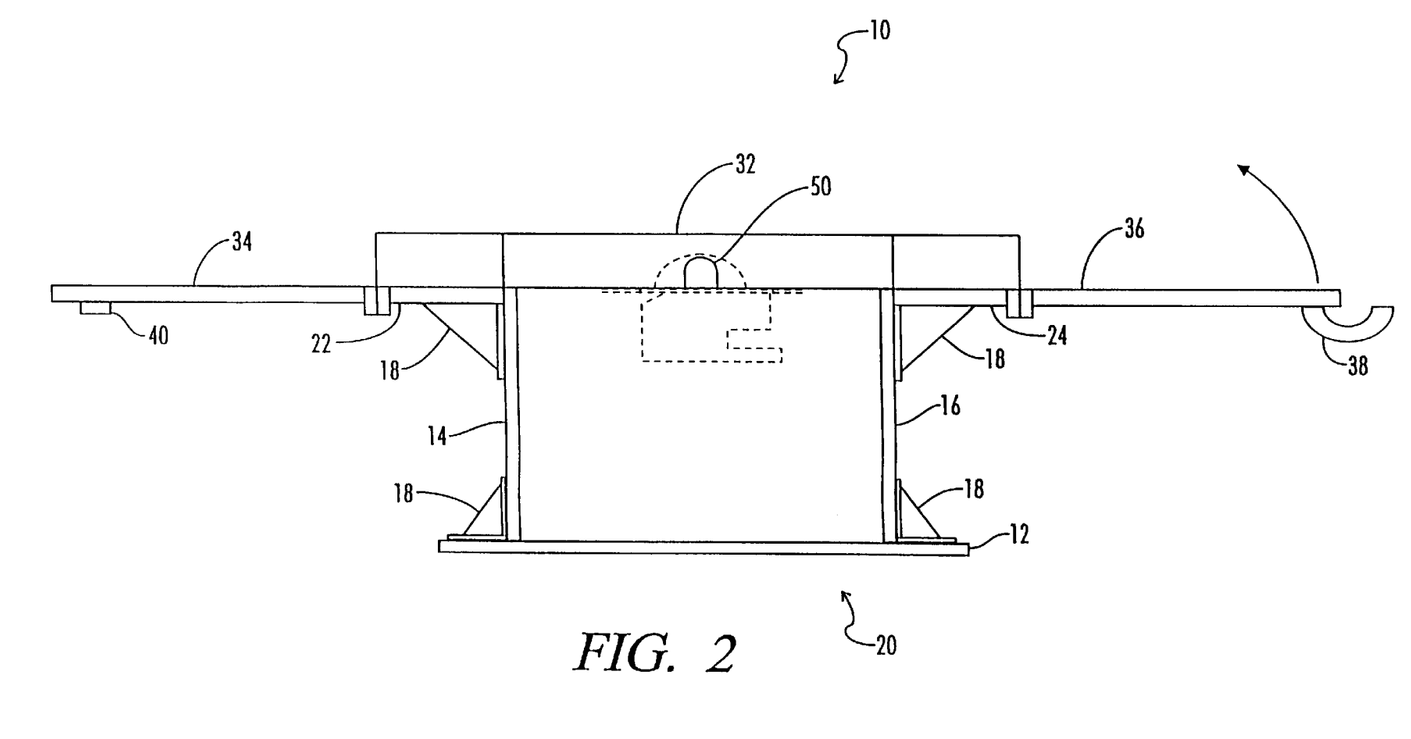
FIG. 2 is a back view of the power tool mounting apparatus of the present invention.

Also shown in FIGS. 1 and 2 of the drawings are the main fence 32 attached to the first fence extension 60 and the second fence extension 62. This forms the back and guide fence which is standard in tabletop configurations of power tools. An additional item shown in FIG. 1 is the use of wings shown as the folding first wing 34 and the folding second wing 36 which are attached to the first extension 22 and second extension 24 to allow for an extended work surface for utilizing long pieces of material. FIG. 2 of the drawings shows how a handle 38 may be attached to the folding second wing 36 so that the folding first wing and folding second wing will come together to allow the handle 38 to attach to the handle latch 40. The handle latch 40 is attached to the folding first wing 34. This allows for the unit to be compacted and utilize the handle 38 to carry the unit for easy transportation purposes.

Returning to FIG. 1 of the drawings, a power tool 46 is shown clamped to the top 26. The power tool 46 is illustrated as a circular saw which utilizes a saw plate 44 for positioning the blade 48. As shown in this illustration, the clamp 42 is utilized to hold the saw plate 44 in a fixable position by clamping the saw plate 44 against the top 26. This allows for the blade 48 to extend through the top 26 and be utilized on a work piece. When a smaller tool such as a router is used, the fence clearing aperture 50 allows for the fence 32 to be utilized to control the edge of the material being worked upon.

The accessory table adjustment lock 52 extends through the first side 14 in order to clamp the top 26 in position within the frame 20. As shown in FIG. 1, the accessory table adjustment lock 52 may also be an extended piece which allows for the lock 52 to extend through the first extension 22 for easy access and adjustment by the operator. In contrast in FIG. 3, it is shown that the accessory table adjustment lock 52 may also be utilized with minor saw table adjustment stops 64 which do not require the lock 52 to extend through the first extension 22. For the position shown as the adjustment stop 64 in FIG. 3, it is only necessary that the lock 52 extend through the first side 14. Thus, a lock 52 is shown which fixably positions the top 26 within the frame 20.

Figure 3:
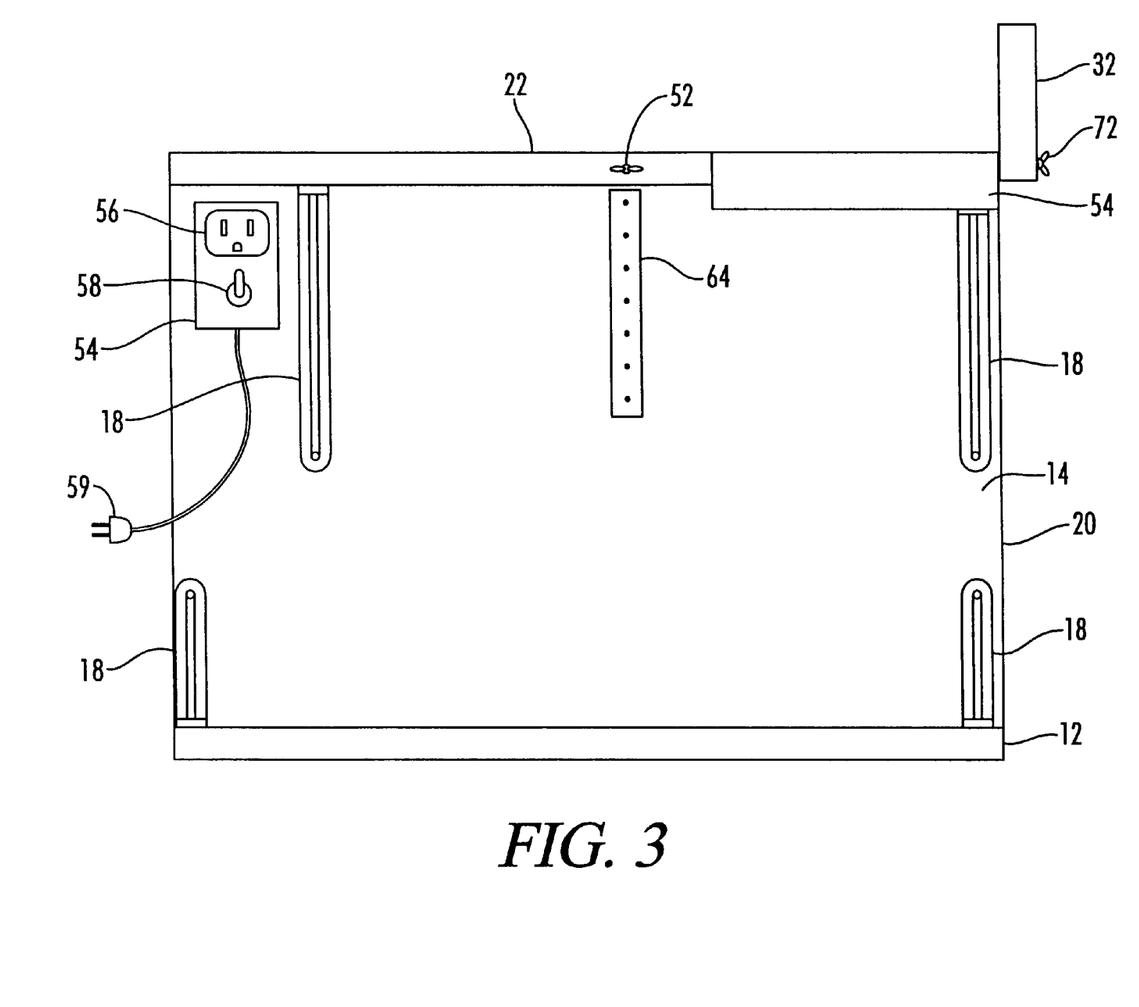
FIG. 3 is a side view of the power tool mounting apparatus of the present invention.

An additional feature shown in FIGS. 1 and 3 of the drawings is the electrical box 54 which is used to supply power to the power tool. The electrical box 54 contains an electrical plug receptacle 56 which is controlled by an electrical switch 58. This allows for the portable power tool to be plugged into the electrical plug receptacle 56 and operatively controlled by the electrical switch 58. The power for the electrical box 54 is supplied through the electrical plug 59 which is attached to a normal power receptacle.

Also shown in FIG. 3 of the drawings is the attachment method for the fence 32 to the frame 20. Wing nuts 72 are utilized to removable attach the fence so that it may be used for applications requiring a fence 32, but may also be removed from the frame 20 when not required.

Figure 4:
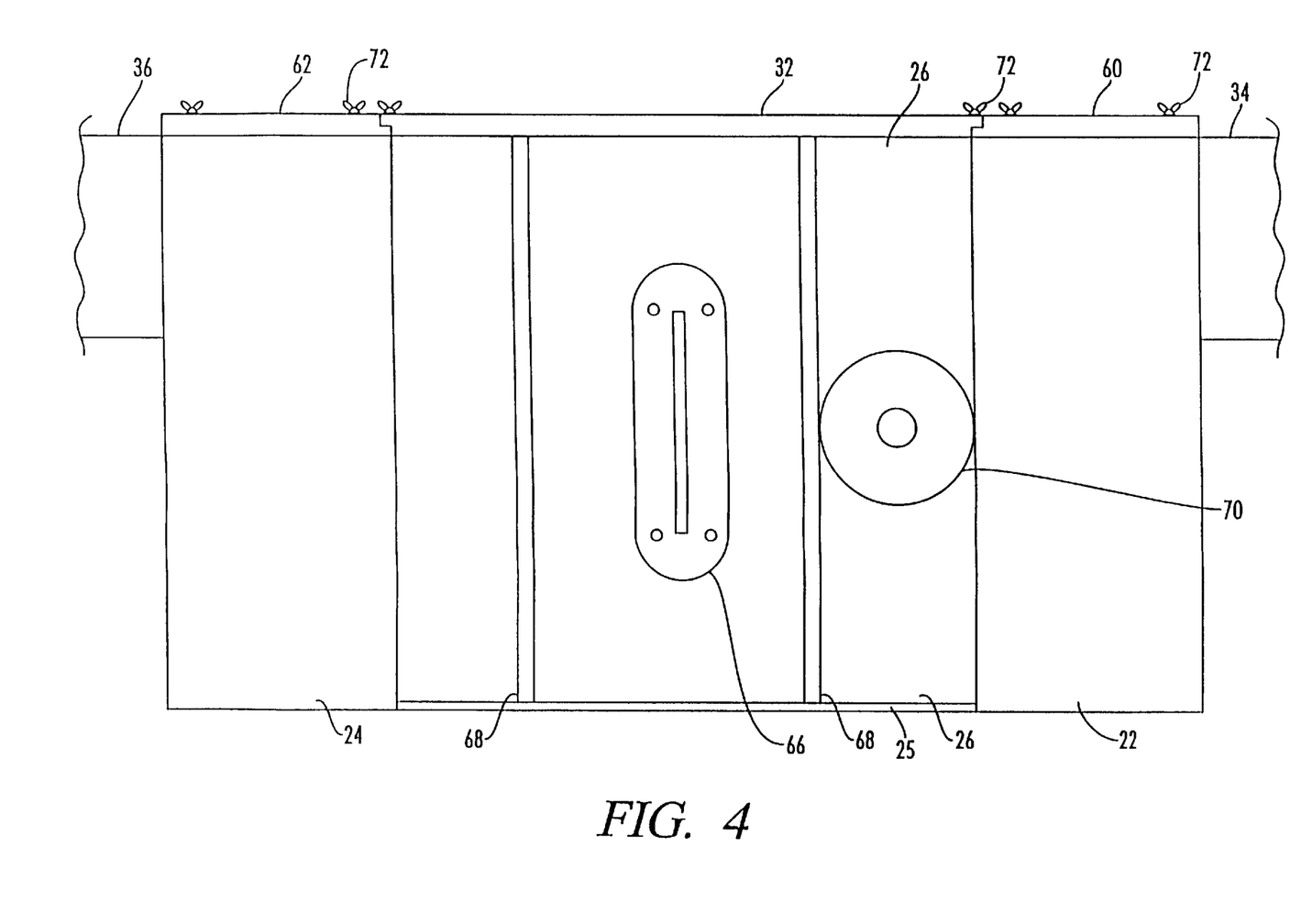
FIG. 4 is a top view of the power tool mounting apparatus of the present invention with the top oriented in a first direction.
Figure 5:
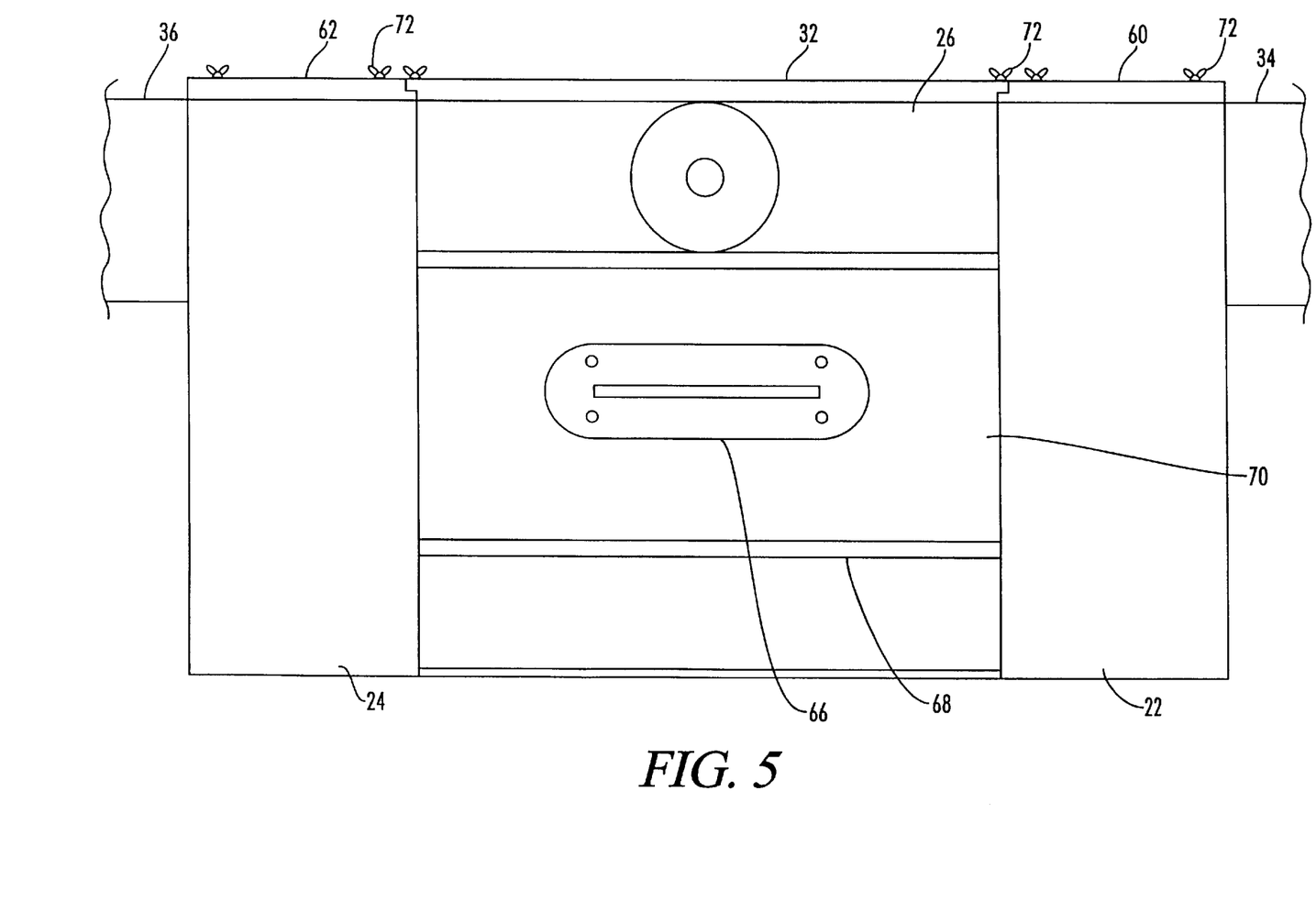
FIG. 5 is a top view of the power tool mounting apparatus of the present invention with the top oriented in a second direction.

FIGS. 4 and 5 of the drawings illustrate the reorientation of the top 26 within the frame 20 by rotating and repositioning the top 26 within the frame 20. As shown in these FIGS. 4 and 5, the top 26 is formed as a square with a slot projection 25 that extends around the perimeter of the top 26. This slot projection 25 is inserted into the sides 14 and 16 for supporting the top 26 in the orientation that is chosen. Thus, because the top 26 is formed as a square, the top 26 may be removed and rotated in relation to the frame 20 for insertion into the sides 14 and 16. This allows for the power tool that is mounted to be oriented in the manner chosen by the user.

Figure 6:
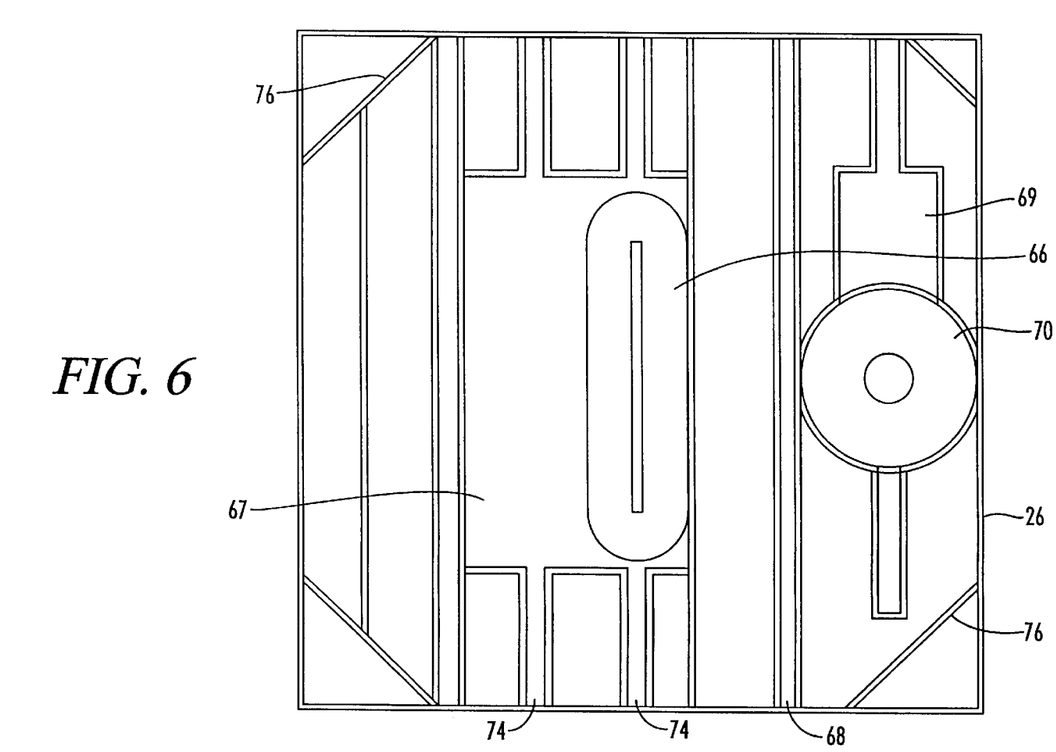
FIG. 6 is a top view of the power tool mounting apparatus of the present invention with supporting ribs and mounting areas.

While the preferred embodiment of the present invention utilizes a solid top 26, FIG. 6 shows how the top 26 may be manufactured from a molded or cast piece. In the preferred embodiment 26, the power tool is supported by a T-groove 74 which is molded or cut into the top 26. This groove 74 may also be used as a miter guide groove when the tabletop is inverted. An important consideration for molding or casting the top 26 is to supply a circular saw base plate mounting area 67 or possibly a saber saw or router mounting area 69. These areas are necessary to allow for the clamping system to properly lock and hold the power tool in the proper position on the top 26. Furthermore, as shown in FIG. 6, the necessary T-grooves and miter grooves 74 and 68 will need to be formed into the top 26 during the manufacturing process. In order to allow for different configurations of power tools, a circular saw and belt sander insert 66 and a saber saw and router insert 70 are envisioned to be separate pieces which may be attached to the top 26 for mounting of various styles and configurations of power tools. The top 26 as envisioned in the cast or molder process would also utilize reinforcement ribs 76 to further support the top 26.

Figure 7:
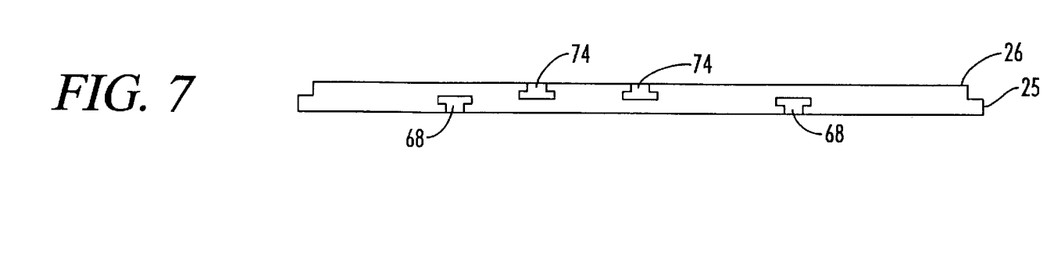
FIG. 7 is a end view of the top shown in FIG. 6.
Figures 8, 9, 10:
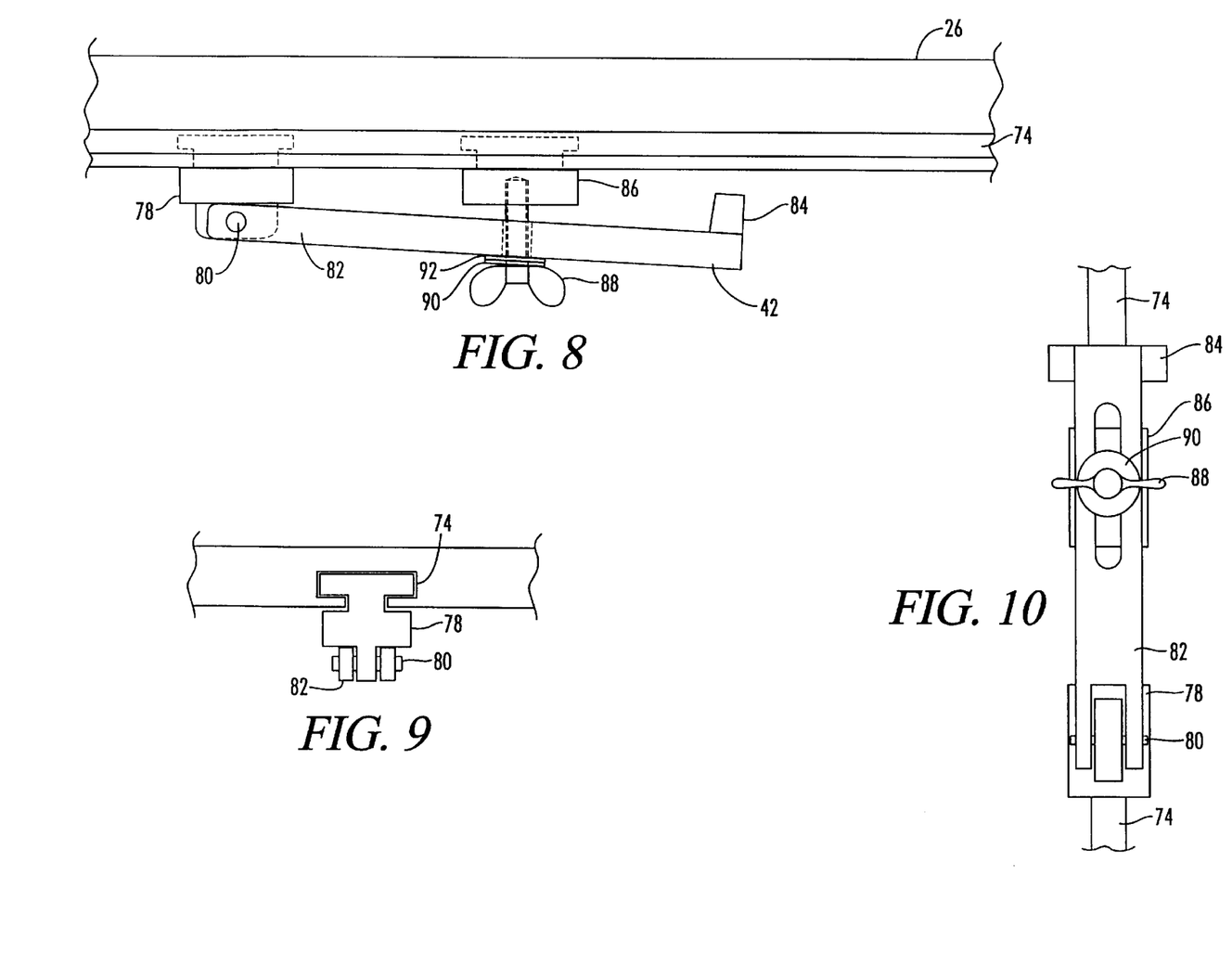
FIG. 8 is a side view of the power tool clamp system of the present invention.
FIG. 9 is an end view of the power tool clamp system of the present invention.
FIG. 10 is a top view of the power tool clamp system of the present invention.

FIG. 7 of the drawings shows the top 26 with the projection 25 cut away to allow one to properly see the orientation of the clamp grooves 74 and the miter grooves 68. Note that the clamp and miter grooves 60 and 74 are interchangeable for various uses. Thus, if the top is in one orientation, the bottom grooves will be utilized as clamp grooves while the upper grooves will be utilized as miter guide grooves. FIGS. 8–10 of the drawings show the clamp system utilized by the present invention. As previously noted, the top 26 contains a clamp T-groove 74 which is utilized to position the clamp system 77 in position. The clamp system 77 comprises a clamp base 78 which is inserted into the T-groove 74 for slidable position to properly orient the clamp system 77. This clamp base 78 supports a clamp swivel 80 which supports the clamp arm 82. The clamp arm 82 extends from the clamp base 78 to the opposite end which utilizes a hard rubber cushion 84 for connection with the power tool to be stabilized. Pressure is placed against the clamp arm 82 by a pressure bolt 88 which screws into the pressure base 86. The pressure bolt 88 is tightened against the pressure base 86 to allow for the clamp arm 82 to be forcibly pressed towards the T-groove 74. The pressure bolt 88 utilizes a washer 90 and a lock washer 92 to allow for the rotation and locking of position of the clamp system 77.

Figures 11, 12:
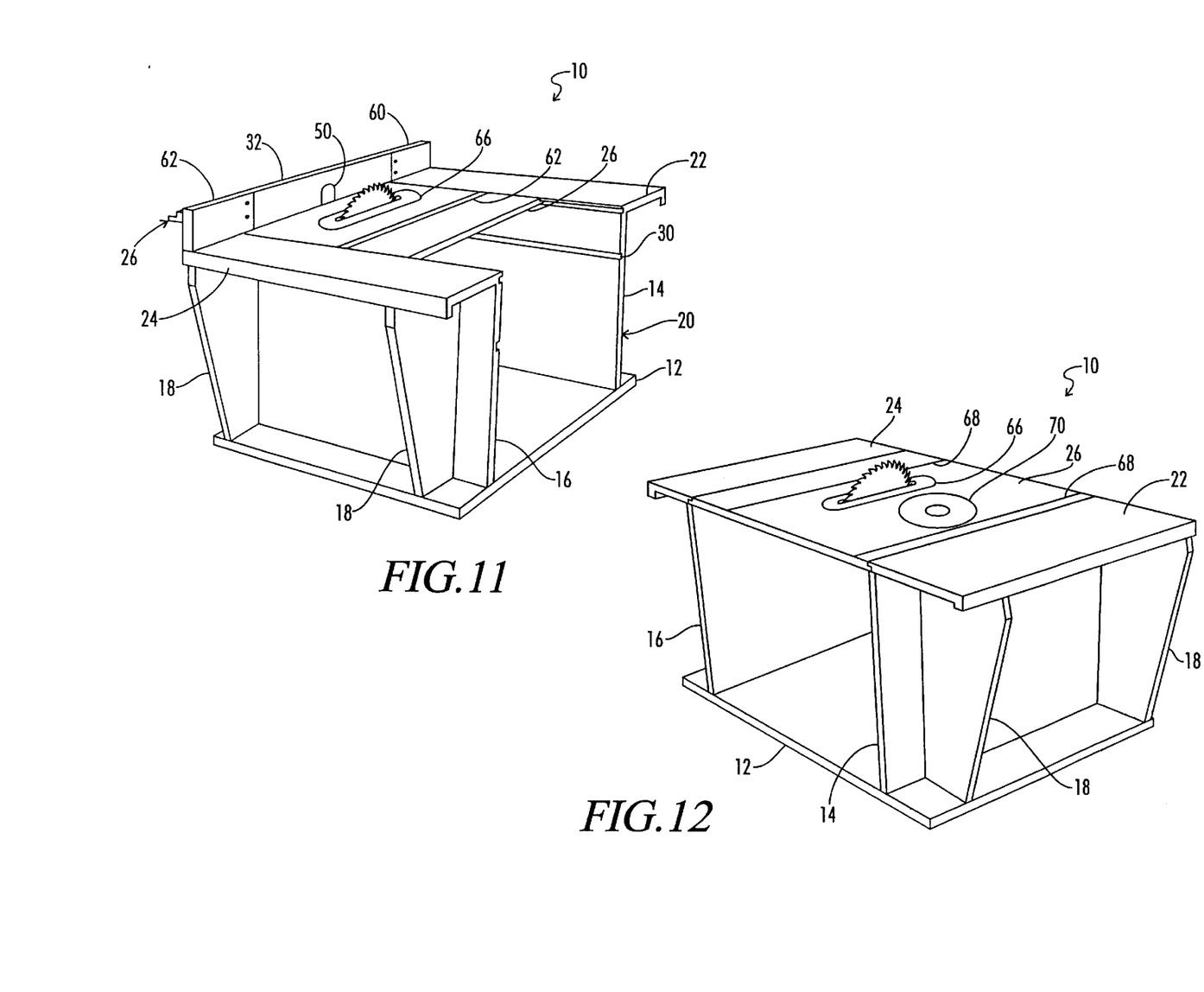
FIG. 11 is an isometric view of the power tool mounting apparatus with a circular saw in first orientation with a table fence guide.
FIG. 12 is an isometric view of the power tool mounting apparatus with a circular saw mounted with the top in a second orientation.

FIG. 11 of the drawings shows an isometric view of the power tool mounting apparatus 10 of the present invention. For this drawing, the top 26 has been horizontally positioned by sliding the top 26 within the frame 20 to allow for the power tool to be moved closer to the fence 32. Thus, the slot projection 25 has been adjusted within the side slot 30 to horizontally position the top within the frame 20.

FIG. 12 of the drawings shows the top 26 rotated within the frame 20 to allow for the power tool to be placed in a different orientation.

Figure 13:
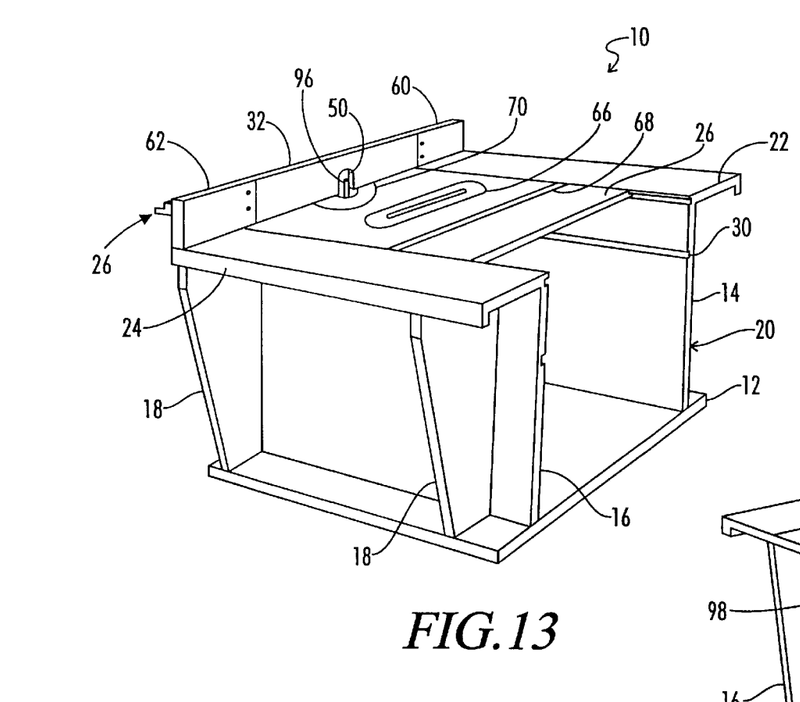
FIG. 13 is an isometric view of the power tool mounting apparatus with a router in a first orientation with a table fence guide.

FIG. 13 of the drawings shows how a router 96 may be positioned within the top 26 to allow for it to be positioned within the fence clearance aperture 50 of the fence 32. Note also that the top 26 has been horizontally positioned within the frame 20 to allow for the router 96 to be utilized along with the fence 32.

Figure 14:
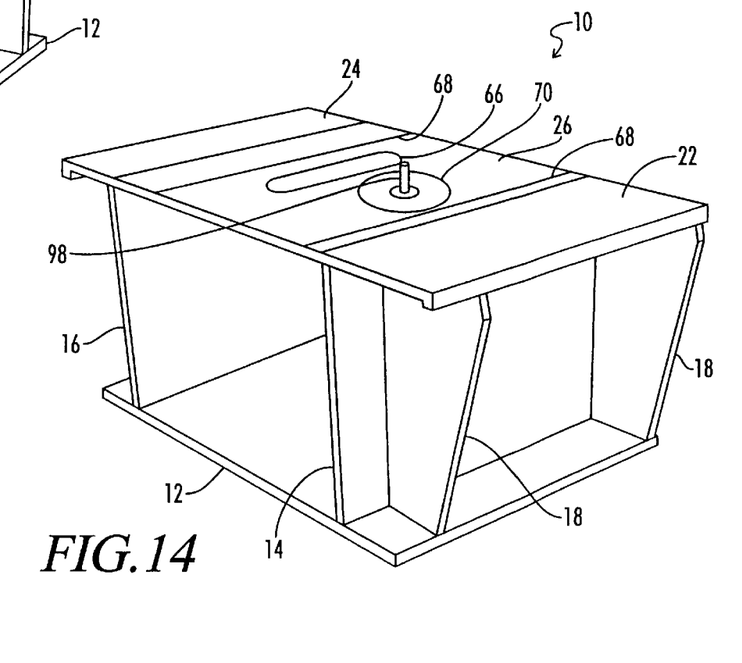
FIG. 14 is an isometric view of the power tool mounting apparatus with a saber saw mounted with the top in a second orientation.

FIG. 14 of the drawings shows how a saber saw 98 may be mounted within the top 26 with the fence 32 removed.

Figure 15:
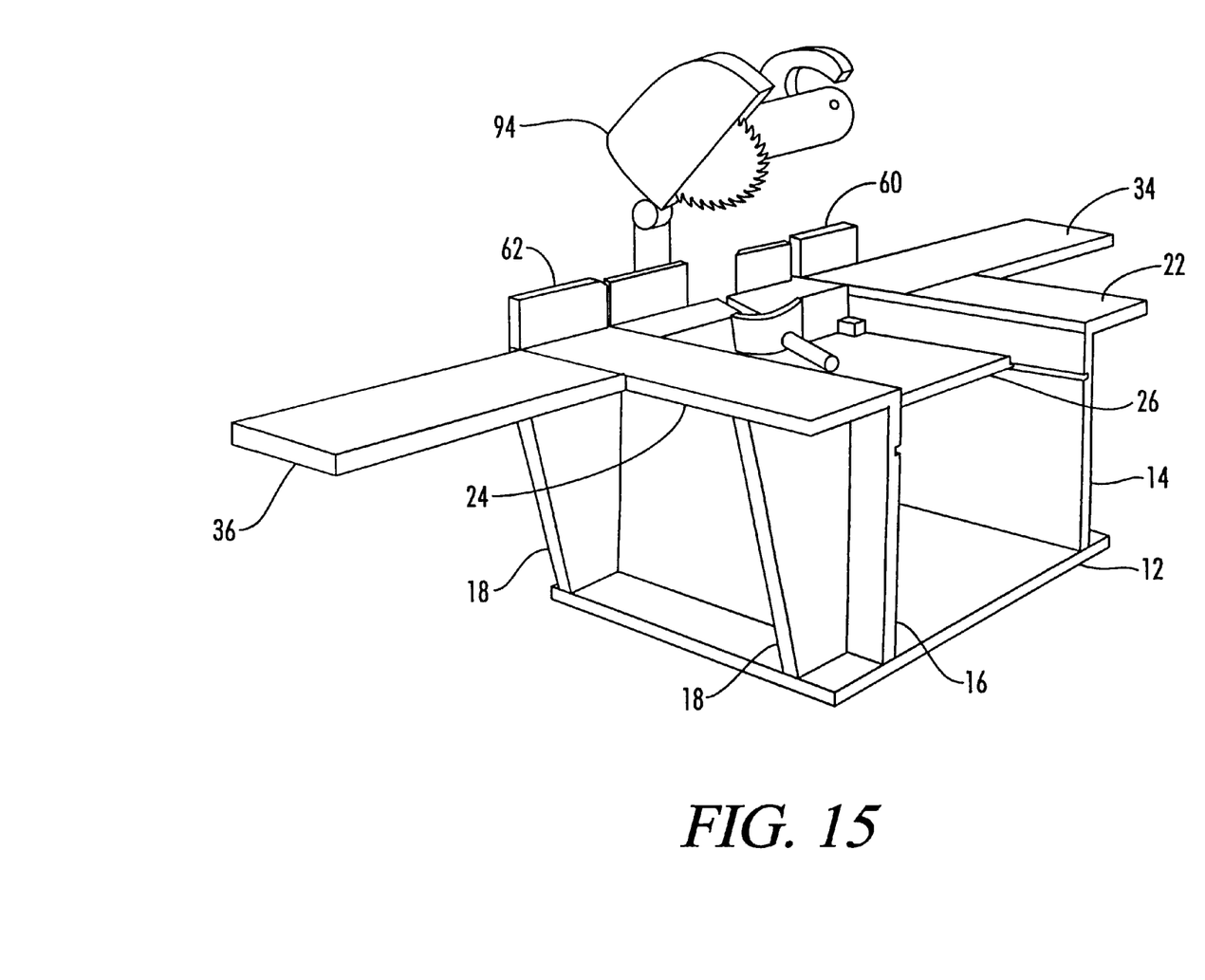
FIG. 15 is an isometric view of the power tool mounting apparatus with a compound miter saw mounted with the top vertically adjusted to support the bottom of the miter saw.

FIG. 15 of the drawings shows how a compound miter saw 94 may be mounted on the top 26 within the frame 20. This allows for the apparatus 10 to be utilized as a work support station for other power mounting tools.

Figure 16:
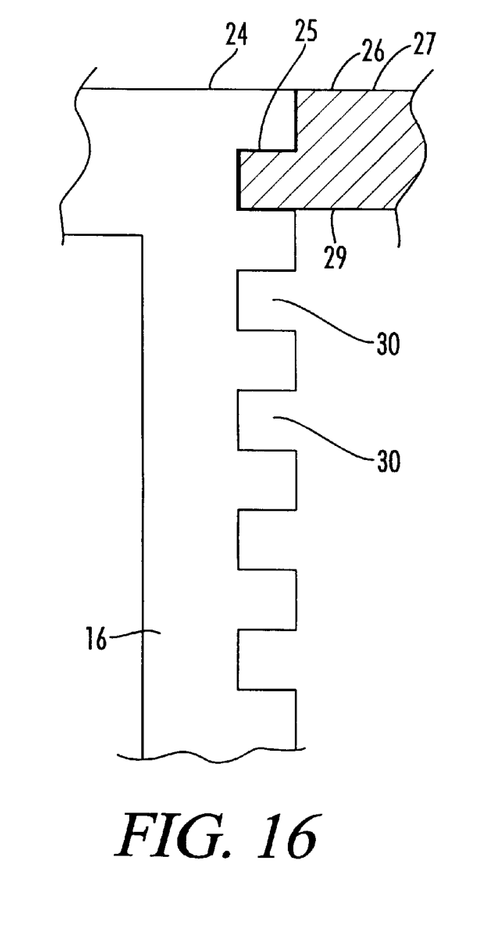
FIG. 16 is a schematic view of the slot and projection mounting system of the present invention.
Figure 17:
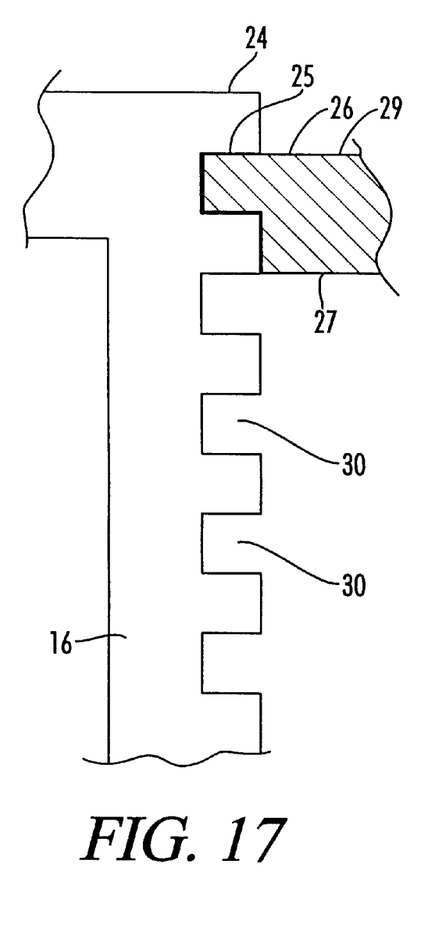
FIG. 17 is a schematic view of the inverted top utilizing the same slot to adjust the vertical height of the top.
Figure 18:
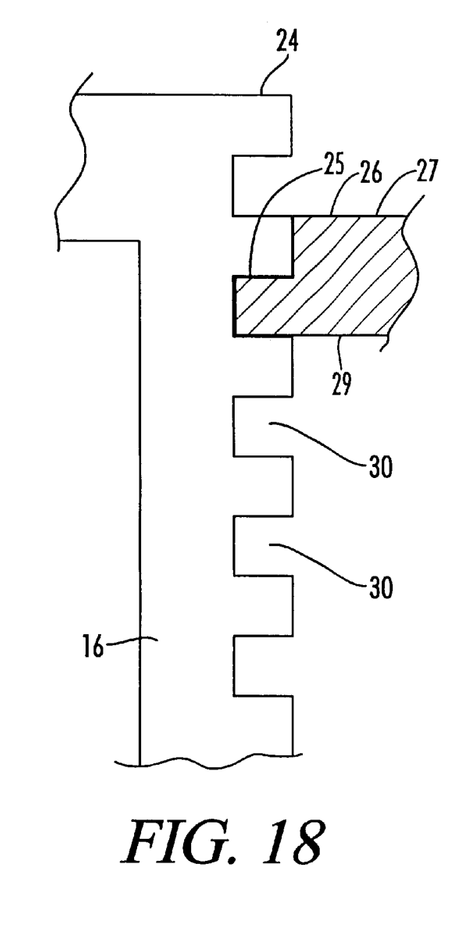
FIG. 18 is a schematic view of the top utilizing a second slot to further adjust the height of the top.

FIGS. 16–18 of the drawings shows how the vertical adjustment of the top 26 within the second side 16 may be constructed. FIG. 16 of the drawings shows the top 26 in alignment with the second extension 24 such that a flat planar work surface may be utilized. In this orientation, the projection 25 is sized as a half-thickness projection that is sized to engage the side slot mounting 30. This allows for the projection 25 to engage the slot profile of the side slot 30 to allow for the top 26 to be properly oriented to form a planar work surface. Thus, the first surface 27 of the top 26 is in alignment with the top of the second extension 24. As shown in FIG. 17 of the drawings, the top 26 has been inverted such that the first surface 27 of the top 26 is now in a lower position. Thus, the second surface 29 has become the upper surface of the top 26 for utilization as a work surface. Here, once the top has been inverted, the slot projection 25 is still utilized within the side slot 30 that was utilized for alignment of the top 26 with the second extension 24. However, since the top 26 has been inverted, the actual physical location of the upper surface of the top 26 has been reduced to be equivalent to the upper portion of the side slot 30 that is being utilized. Thus, the same side slot 30 allows for two different height adjustments for the top 26. As shown in FIG. 18 of the drawings, the additional of a plurality of further side slots 30 with the slot profile allows for the top 26 to be further positioned in another vertical adjustment. Thus, the total number of vertical adjustments for the top 26 will be controlled by the number of side slots 30 multiplied times two for allowing the inversion of the top 26 when mounted within the side slot 30.

Thus, although there have been described particular embodiments of the present invention of a new and useful Power Tool Mounting Stand, it is not intended that such references be construed as limitations upon the scope of this invention except as set forth in the following claims.

What is claimed is:

1. A power tool mounting apparatus for operatively positioning a power tool, comprising:

a frame;

a top for fixably positioning said power tool within said frame, wherein said top is rotatable adjustable within said frame;

a slot mounting with a slot profile on said frame; and a slot projection on said top) matching said slot profile;

wherein said slot projection allows said top to be rotated and mounted to the slot mounting in said frame in a plurality of orientations.

2. The apparatus of claim 1, further comprising:
a top lock for fixably positioning said top within said frame; and
a clamp system to hold said power tool to said top.

3. The apparatus of claim 1, wherein said frame includes:
a base;
a side support system extending from said base; and
a work surface supported by said side support system.

4. The apparatus of claim 1, further comprising:
a handle mechanically connected to the frame for carrying said apparatus during transportation.

5. The apparatus of claim 1, further comprising:
a removable fence fixably mounted to the frame.

6. The apparatus of claim 1, wherein said top is vertically adjustable within said frame.

7. A power tool mounting apparatus for operatively positioning a power tool, comprising:
a frame;
a top for fixably positioning said power tool within said frame;
a plurality of slot mountings with a slot profile on said frame in a vertical arrangement; and
a slot projection on said top matching said slot profile;
wherein said slot projection allows said top to be mounted to a slot mounting to vertically position said top within said frame.

8. A power tool mounting apparatus for operatively positioning a power tool, comprising:
a frame;
a top for fixably positioning said power tool within said frame, wherein said top is adjustably positionable within said frame;
a slot mounting with a slot profile on said frame; and
a slot projection on said top matching said slot profile;
wherein said slot projection may be inverted to vertically adjust said top positioning within said frame.

9. A power tool mounting apparatus for operatively positioning a power tool, comprising:
a frame:
a top for fixably positioning said power tool within said frame, wherein said top is horizontally adjustable within said frame;
a slot mounting with a slot profile on said frame; and
a slot projection on said top matching said slot profile;
wherein said slot projection allows said top to be horizontally positioned within the slot mounting in said frame in a plurality of positions.

10. A power tool mounting apparatus for operatively positioning a power tool, comprising:
a frame;
a top for fixably positioning said power tool within said frame, wherein said top is adjustably positionable within said frame;
a slot mounting with a slot profile on said frame; and
a slot projection on said top matching said slot profile;
wherein said slot projection slidably engages said slot mounting to horizontally position said top within said frame.

11. A power tool mounting apparatus for operatively positioning a power tool, comprising:
a frame;
a top for fixably positioning said power tool within said frame, wherein said top is adjustably positionable within said frame, wherein said top is formed as a square with a half-thickness projection sized to engage vertically positioned slots on said frame to allow for vertical, horizontal, and rotational positioning of said top within said frame.

12. The apparatus of claim 1, wherein said top includes:
inserts for mounting said power tool.

13. The apparatus of claim 1, wherein said inserts allow for positioning a power tool selected from a group including a circular saw, a router, a belt sander, and a saber saw.

14. The apparatus of claim 1, wherein said top includes t-shaped grooves that may be utilized as both a miter guide groove and a T-clamp groove.

15. The apparatus of claim 1, wherein said top includes:
a top stop lock for frictionally positioning said top.

16. A method for adjusting a top in a power tool mounting stand for positioning portable power tools, comprising:
rotating said top about a vertical axis to re-orient said portable power tool from a first orientation to a second orientation, wherein the second orientation is perpendicular to said first orientation.

17. A method for adjusting a top in a power tool mounting stand for positioning portable power tools, comprising:
sliding said top in the power tool mounting stand to re-orient said portable power tool from a first position to a second position in the top plane.

18. A method for adjusting a top including an off-center projection slidably engaging said top with a power tool mounting stand for positioning portable power tools, comprising:
disengaging said projection from said power tool mounting stand;
inverting said top to vertically position said portable power tool and re-orient the projection in relation to the power tool mounting stand; and
engaging said projection with said power tool mounting stand.

19. A method for adjusting a top in a power tool mounting stand for positioning portable power tools, comprising:
selectively inserting said top into vertical adjustment positions in said power tool mounting stand to vertically position said portable power tool.

* * * * *